United States Patent
Ohnishi

(10) Patent No.: US 7,111,106 B2
(45) Date of Patent: Sep. 19, 2006

(54) BUS COMMUNICATION SYSTEM BY UNRESTRAINED CONNECTION AND A COMMUNICATION CONTROL METHOD THEREFOR

(75) Inventor: Makoto Ohnishi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 181 days.

(21) Appl. No.: 10/808,560

(22) Filed: Mar. 25, 2004

(65) Prior Publication Data

US 2004/0205279 A1 Oct. 14, 2004

(30) Foreign Application Priority Data

Mar. 26, 2003 (JP) .............................. 2003-084979

(51) Int. Cl.
*G06F 13/20* (2006.01)
*G06F 13/14* (2006.01)
*H04L 12/28* (2006.01)
*H04J 3/17* (2006.01)
*G06F 9/46* (2006.01)

(52) U.S. Cl. ...................... 710/313; 710/305; 370/421; 370/434

(58) Field of Classification Search ................ 710/305, 710/313, 300, 33, 110, 316; 715/735; 365/189.04; 711/155, 203; 709/223, 238, 208, 213, 253; 370/434, 230, 401, 402, 351, 257, 244, 464, 370/492, 421
See application file for complete search history.

(56) References Cited

U.S. PATENT DOCUMENTS

| | | | | |
|---|---|---|---|---|
| 4,734,909 A | * | 3/1988 | Bennett et al. ............. | 370/462 |
| 5,319,754 A | * | 6/1994 | Meinecke et al. ............ | 710/52 |
| 5,452,330 A | * | 9/1995 | Goldstein ................... | 375/257 |
| 5,923,664 A | * | 7/1999 | Aldebert et al. ............ | 370/465 |
| 6,330,005 B1 | * | 12/2001 | Tonelli et al. .............. | 715/735 |
| 6,405,248 B1 | * | 6/2002 | Wood ......................... | 709/223 |
| 6,714,541 B1 | * | 3/2004 | Iyer et al. ................... | 370/392 |
| 6,763,017 B1 | * | 7/2004 | Buckingham et al. ....... | 370/352 |
| 6,798,769 B1 | * | 9/2004 | Farmwald ................... | 370/352 |
| 6,829,215 B1 | * | 12/2004 | Tornar ........................ | 370/223 |
| 2004/0205279 A1 | * | 10/2004 | Ohnishi ...................... | 710/305 |

FOREIGN PATENT DOCUMENTS

| | | |
|---|---|---|
| JP | 2000-194649 | 7/2000 |
| JP | 2002-202835 | 7/2002 |
| JP | 2002-335260 | 11/2002 |
| WO | WO 02/077835 A1 | 10/2002 |

* cited by examiner

OTHER PUBLICATIONS

"A multiprocessor architecture for high-rate communication processing" by E.E Johnson (abstract only) Publication date: Nov. 4-7, 1991.*

*Primary Examiner*—Gopal C. Ray
(74) *Attorney, Agent, or Firm*—VolentineFrancos&Whitt,PLLC

(57) ABSTRACT

A USB system is capable of connecting, based on the function of constructing and connecting a virtual port by a virtual port constructing functional unit, a number of devices exceeding a prescribed number of tiers having a hub device in a connection topology of a host device—hub devices—a device of the USB system. When the host device addresses a device on its downstream side, the hub device acts as if it is a specified device by a proxy response functional unit including the hub device, and instantaneously performs a proxy response depending upon the situation that, for example, the device on its downstream side is not ready. This causes no problem associated with the turn-around time of the USB bus even if the prescribed number of tiers is exceeded.

25 Claims, 9 Drawing Sheets

BUS COMMUNICATION SYSTEM BY UNRESTRAINED CONNECTION AND A COMMUNICATION CONTROL METHOD THEREFOR

BACKGROUND OF THE INVENTION

1. Field of the Invention

The invention relates to a bus communication system, and in particular to a bus communication system in which a hub device is provided between a host and a bus device under the universal serial bus (USB) or USB-OTG (USB-On-The-Go) standard and communication is made between the host and the bus device over tiered hub devices. The invention relates also to a line-concentrating and switching device advantageously for use in a hub device, which is provided in tiers for transmitting data. This invention further relates to a host device to control the hub device and devices, which are interconnected in tiers to form a network.

Furthermore, the invention relates to a communication control method for a bus communication system, which is in keeping with the function and topology of hub and bus devices provided in tiers, and in particular to a communication control method advantageously applicable to a multi-stage connection of bus devices under the USB or USB-OTG standard. Finally, the invention relates to a communication control method of a network system composed of plural, interconnected networks under different standards, in which communication may be made from one network to a device connected in a lower layer of another network. The present invention may be applied with advantage to for example a communication control method in a network system where there co-exist networks of the USB-OTG and USB standards.

2. Description of the Background Art

Nowadays, USB devices have become widespread as a simplified peripheral of an personal computer, while the USB has come to be well-known as an interface which takes the place of, for example, the RS-232C (Recommended Standard-232C) which is a conventional serial interface standard. The USB standard was initially of the USB version 1.0 and later updated to the USB version 1.1. Still later, the USB standard has been updated to version 2.0, in which the transmission rate is raised from conventional 12 Mbit/sec to 480 Mbit/sec in keeping with the increasing operating speed of peripherals.

First, the USB is featured by a low cost. Second, the USB is featured by allowing for freedom in layout. Specifically, the USB is able to cope with the plug and play function, which automatically recognizes peripheral connected to allow for use without setting a driver. Additionally, the USB has a hot plug function, which allows plug-in and plug-out of a peripheral without turning off the power supply. In a layout aspect, the hub device may be applied for interconnecting a terminal device in the LAN (Local Area Network).

Japanese Patent Laid-Open Publication No. 2002-202835 proposes a peripheral electronic device, which is premised on a tree connection topology and may be directly connected to another peripheral electronic device similarly premised on a tree connection topology through the same connector. The proposed electronic device checks the state of connection resulting from the coupling of the connector to verify to which the connector is connected, in order to perform an operation accordingly.

Since the USB standard allocates seven bits to the address of a bus device, 127 USB devices at the maximum can be connected, in addition to a host device. However, hub devices and USB cables suffer from delay time. In consideration of delay time, the tree connection structure, with a host device located at an apex point, is limited to seven tiers. Specifically, if a host device presents in the first layer, the USB devices are of such a structure in which up to the seventh tier is allowed for the terminal USB device. However, the USB prescriptions lack for a statement that the connection structure is to be limited to seven tiers, and simply provide for delay time of USB devices, etc.

It is explicitly stated that delay time from the upstream to downstream end connector of a hub device shall be 70 nanosecond or less, and that a signal propagation delay in one direction shall be 30 nanosecond or less. In addition, it is explicitly stated that a cable used shall have attenuation characteristics of 5.8 dB or less per cable at a frequency of 400 MHz.

There is disclosed in Japanese Patent Laid-Open Publication No. 2000-194649 a method for connecting electronic equipment of a tree connection topology directly to each other without contravening the USB standard. In this connection method, a device of the USB standard is used in common by plural host devices satisfying the USB standard. The plural host devices are connected to plural high-end ports of a hub device, as a connection device for electronic equipment, to plural low-end ports to which devices of the USB standard are connected. One of the high-end ports and one of the low-end ports are selected to operate the host device and the device of the USB standard associated with the selection. There is no necessity for detaching and connecting again the cables, thus improving user friendliness.

There is also disclosed in Japanese Patent Laid-Open Publication No. 2002-288112 an interface system and an interface device in which the USB standard is satisfied and a free network system may be constructed in such a manner as to override the constraint imposed by the standard. In order to realize this, a semiconductor device for communication control is featured by host controlling means and function controlling means which manage communication control as a slave, with the host controlling means and the function controlling means mounted on a single semiconductor chip and being in operation simultaneously. The interface system includes a semiconductor device for communication control, a first connector connectable to host equipment, a second connector connectable to function equipment, and an external switching means connected between the first and second connectors and the transmitting/received data input and output terminals of the semiconductor device for communication control. The external switching means are controlled in an operatively interlocked relation to the switching means provided within the semiconductor device for communication control, in order to connect the host equipment or the function equipment at all times to the two connectors, whereby data may be transmitted and received between the devices without changing the cable connection.

It should be noted that the delay time such as encountered with the above-mentioned USB standard limits the turn-around time of a USB bus. The turn-around time is provided for preventing signal collision on the bus. Thus, until a device of the USB standard has received a packet from a host device and the turn-around time elapses, the device of the USB standard cannot send out a packet to the host device. This turn-around time is requested to secure when devices of the USB standard communicate with each other.

The USB standard provides that the cable length in general shall be five meters at the maximum. Thus, the total cable length from a host device to a terminal device of the USB standard in the lowermost layer amounts to 30 meter. However, the USB standard simply states that the length shall be limited by the aforementioned attenuation characteristics and the signal propagation time. Such USB prescriptions are presumably intended to provide for flexibility in order to take into account the possible future improvement in cables, etc. However, rather detailed prescriptions are provided in connection with connectors in view of securing the compatibility.

With USB devices, the bus topology takes a so-called star connection. Between a host device of the first tier and a USB device located at the lowermost layer or the seventh tier, there are five hub devices, that is, five tiers. If a number of USB devices corresponding to the connectable limit are connected to a sole hub device, the connection topology may be likened to that of placing many loads to a sole electrical outlet. In actual, if tiers are formed using one, or at most two, hub devices, with a personal computer, placed in a home, as a host, plural USB devices, such as a keyboard, a mouse, a printer, a scanner, a terminal adaptor (TA) or an external storage unit, are connected to the tiers in a disorderly fashion. Even granting that up to 127 USB devices can be connected under the USB standard, an extremely difficult condition emerges with the wiring necessary for the connection.

If, in order to improve the difficult condition, plural USB devices are connected in series and connection is made in such a manner as to override the seven-tier limitation, the result is a neat connection topology. If, for example, connection is made to a tier beyond the limitation on the number of tiers, the number of USB devices connected per tier may be reduced, such that the number of the ports of the topology may be made approximately equal to the number of the ports in the above-mentioned difficult condition. Specifically, the resulting connection is desirable for a case in which a large number of USB sensors are arranged in a wide area and measurement is made on the sensors by a personal computer operating as a host device. In this case, a portable USB device is desirably used as the USB sensor. However, in order to make connections in this topology and meet the aforementioned USB prescriptions, it is requested to solve the problem of the delay time of USB devices and/or the turn-around time of USB buses.

Recently, there is proposed the USB-OTG standard as an architecture of constructing a more flexible network using devices of the USB standard. This architecture, which employs an interface establishing peer-to-peer connection between USB devices without the mediation of a host device, is effective to moderate several difficult conditions.

The first difficulty is the increased load in adding a function owned by the host device to the aforementioned USB portable device. This increased load is caused by providing a USB portable device with a storage area for storing plural device drivers. The second difficulty is the necessity of supplying a large current to a USB portable device, specifically, the use of a high-efficiency power supply. The third difficulty is the physical load imposed by employing an "A" connector for the host device.

With the USB-OTG standard, the function as specified in connection with the first difficulty in communication between USB portable devices is not needed. Consequently, the standard that slightly complements the aforementioned standard of the USB Version 2.0 (On-The-Go Supplement to the USB 2.0 Specification) was formulated in the year of 2001.

The connection between the first and second networks under the USB-OTG standard will be described. Before this description, the connection topology of the first network in the case of using the USB standard will be described. In the first network, a PDA (personal digital assistant) working as a host device is connected by a USB cable to a hub device, which is connected through one of the ports owned by the hub device and a USB cable to a printer. It is now assumed that a personal computer as a host device is newly connected to the hub device and the printer is controlled from this personal computer in order to use the printer. The newly added personal computer is connected through a port of the hub device and four-conductor USB cable. However, the personal computer is unable to directly communicate with the printer, even though it is attempted to use the printer over a hub device. The reason is that the PDA is designed to supervise the network including the PDA, hub device and printer in accordance with the USB standard, in other words, that the first network in the state of art is not constructed in accordance with the USB-OTG standard.

The newly added personal computer is connected to the PDA as a constituent element of the second network. The USB-OTG standard is applied to the PDA and the personal computer used in the second network. The respective OTG ports of the PDA and the personal computer are connected to the five-conductor OTG cable. In this case, the communication is possible between the personal computer and the PDA on the network. However, the personal computer on the second network cannot utilize the printer in the first network. The reason is that, while the USB-OTG standard allows communication in the second network, specifically, communication between the personal computer and the PDA, the printer in the first network operating in the USB standard communicates only with the PDA of the host device.

SUMMARY OF THE INVENTION

It is an object of the present invention to provide a bus communication system and a connection method therefor whereby the USB prescriptions may be met and free or unrestrained connection of USB devices may be achieved to improve, the communication efficiency.

It is another object of the present invention to provide a network system in which, even if the networks of the USB-OTG and USB standards co-exist, communication may be made from the network of the USB-OTG standard to a bus device connected to the network of the USB standard, and a connection method for the network system.

For accomplishing the above object, the present invention provides a bus communication system including a host device managing a bus, a plurality of line concentrators located on lower tier with respect to the host device for transferring communication with the host device, and a bus device connected to a port of one of the line concentrators or to a port of the host device, as a destination of connection, the bus device operating and communicating with the destination of connection, wherein the line concentrators and the device operate under a Universal Serial Bus (USB) standard. Each of the line concentrators comprises a first functional block constructing a virtual port with respect to a port physically provided to the line concentrator and connecting the bus device to the virtual port, and a second functional block for performing a proxy response and a setting to the communication transferred to the bus device connected to the virtual port. One of the line concentrators has a port connected to another one of the concentrators, which has a port connected to the bus device, each of the line concentrators establishing a function of the first and second functional blocks in accordance with a connection of the line concentrator and the bus device.

In accordance with the bus communication system of the present invention, the first and second functional blocks are added to the line concentrator. By the function of the first functional block, i.e. constructing and connecting the virtual port, a number of bus devices exceeding the prescribed number of connection tiers may be connected to the bus communication system. When a bus device connected to the upstream facing port of the line concentrator is addressed, the bus device performs usual response in accordance with the USB standard. When a bus device connected to the downstream facing port of the line concentrator is addressed, the line concentrator acts as if it is the addressed device, by the function of the second functional block, and usually responds, by proxy, that the device on the downstream side is not ready. Thus, even if the limitation of seven connection tiers of the bus devices addressed on the downstream side is exceeded, there is raised no problem of the turn-around time of the USB bus. In actual, even when a significant delay is caused until a response is returned, a free connection may be assured in excess of the limitation on the number of the connection tiers.

For accomplishing the above objects, the present invention provides a line concentrator arranged in a lower tier with respect to a host device managing a bus and transferring communication with the host device. The line concentrator comprises a first functional block operating under a USB standard and constructing a virtual port with respect to a port physically provided to the line concentrator and connecting a bus device to the virtual port, and a second functional block operating for performing a response and a setting for the communication transferred to a device connected to the virtual port to take the place of the bus device. The line concentrator has a port connected to another line concentrator, which has a port connected to the bus device and establishes a function of the first and second functional blocks in accordance with a connection of the line concentrator and the bus device.

In accordance with the line concentrator of the present invention, having the first and second functional blocks, the functions of these blocks are established, depending on the connection statuses of the line concentrator to realize the construction and connection of the virtual port and proxy response as well as to satisfy the turn-around time conditions prescribed in the USB standard to enable free connection surpassing the prescribed limitations on the number of connection tiers.

For accomplishing the above objects, the present invention also provides a host device for managing a bus under a USB-OTG standard and comprising a transfer functional block having another device of the USB-OTG standard arranged on an upstream side of the host device, the transfer functional block arbitrating the communication from another bus device to a device of the USB standard connected in a lower layer with respect to the host device and a proxy response functional block making a proxy response from the bus device of the USB standard.

In accordance with the host device of the present invention, a device connected to the downstream side operates as if it is connected to the host device, based on the functions of construction and connection of the virtual port by the transfer functional block, thereby increasing the number of the connection tiers over a prescribed value to enable free connection. Moreover, the requirement for the turn-around time, as prescribed in the USB-OTG standard, may be satisfied with the proxy response by the proxy response functional block.

With the bus communication system, the line concentrator and the host device according to the present invention, in which the virtual port constructing functional block is provided in a device of the USB standard, relatively free connection may thus be realized for the device of the USB standard. Moreover, by providing the proxy response functional block, the problem raised on the turn-around time may be overcome. As a consequence, the disorder in USB interconnection as met in a household may be minimized, while the connection of a number of bus devices becomes possible in excess of the prescribed number of connection tiers. With the line concentrator and the host device, the aforementioned functional blocks may be operated depending on the conditions of the connection topology, thereby resolving the problems specific to the respective devices.

For accomplishing the above objects, the present invention provides a communication control method for a bus communication system in which a plurality of line concentrators, each having line concentrating and switching functions, are connected to a host device, and are operated under a Universal Serial Bus (USB) standard. The method comprises a first step of constructing a virtual port in one line concentrator when another line concentrator is connected to a physical port provided to the one line concentrator and a bus device is connected to the other line concentrator, a second step of setting an operation as if the bus device is connected to the virtual port, a third step of causing the one line concentrator to respond, in place of the bus device, to the communication associated with setting of bus connection from the host device to the bus device, and a fourth step of setting the bus connection by communication with the one line concentrator responsive to the response.

In accordance with the bus communication method for the bus communication system of the present invention, in which one line concentrator, another line concentrator and a bus device are interconnected in cascade, a virtual port is constructed in the one line concentrator and setting is made for a case in which the bus device is connected to the virtual port, whereby the number of the connection tiers of the line concentrators or the devices may be over the prescribed value. By the proxy response of the one line concentrator, the host device may acquire a response in a shorter time than the turn-around time. Although the time elapsing until the device returns an intrinsic response is protracted appreciably, the number of connection tiers that may be achieved may exceed the prescribed value, while free or unrestrained connection may also be achieved.

With the communication control method for the bus communication system according to the present invention, a virtual port is constructed in one line concentrator, depending on the connection topology of the devices, and setting is made for a case where the device is connected to the virtual port, thereby increasing the number of connection tiers of line concentrators and devices beyond to the prescribed value. By means of proxy response by the line concentrator, the host device may acquire a response in a shorter time than the turn-around time to enable the free connection as well as the connection exceeding the limitations on the number of the connection tiers.

For accomplishing the above objects, the present invention also provides a communication control method for a network system including a first network formed by a device satisfying a USB-OTG standard and being a connection device, and a second network formed by connecting a line concentrator having a transferring and line-concentrating function and operating on a USB standard to a port of the connection device and by connecting a device of the USB standard to a port of the line concentrator, the second network being connected to the first network. The method comprises a first step of determining the state of connections and constructing a virtual port distinct from a physical port actually provided to the connection device subject to a device location of the connection device, a second step of setting the device of the USB standard connected to the port of the line concentrator by the function of the connection device in setting an operation as if the device of the USB standard is connected to the virtual port, a third step of detecting data transferred to the device of the USB standard by the connection device, transferring the data to the device of the USB standard responsive to the detection and responding in proxy for the device of the USB standard, and a fourth step transferring the data from the connection device to the device of the USB standard subsequent to the response.

In accordance with the communication control method for a network system according to the present invention, if the connection device is connected or located simply as a device, as verified by decision on the connection topology, a virtual port is then constructed in the connection device. By setting the virtual port, the device of the USB standard acts as if it is connected to this port, thereby enabling the connection in excess of the prescribed number of connection tiers. The data transfer to the device of the USB standard is detected by the connection device and, responsive to the detection, the data are transferred to the device of the USB standard, thereby enabling communication between the devices of the plural heterogeneous networks. The connection device responds in place of the device of the USB standard. On receipt of this response, the connection device transfers data to the device of the USB standard by way of performing proxy response to the communication. Thus, the communication between plural heterogeneous networks may be controlled while the USB and USB-OTG standards are met and the functions specific to the connection device are adaptively and selectively exploited depending on the prevailing connection statuses.

With the communication control method for the network system according to the present invention, the connection device constructs and sets a virtual port, depending on a decision on the connection topology, to enable an operation as if the device of the USB standard is connected to the connection device, thereby enabling the connection of a number of bus devices in excess of the prescribed number of connection tiers. By transferring data to the device of the USB standard, depending on the detection in the connection device, communication may be made with devices of different, heterogeneous networks. After the connection device performs proxy response to take the place of the device of the USB standard, the data are transferred from the connection device to the device of the USB standard to reduce the turn-around time. The communication between different, heterogeneous networks may be controlled while the USB and USB-OTG standards are met and the functions specific to the connection device are selectively and adaptively exploited depending on the prevailing connection statuses. There may thus be provided a remarkably user-friendly network system.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
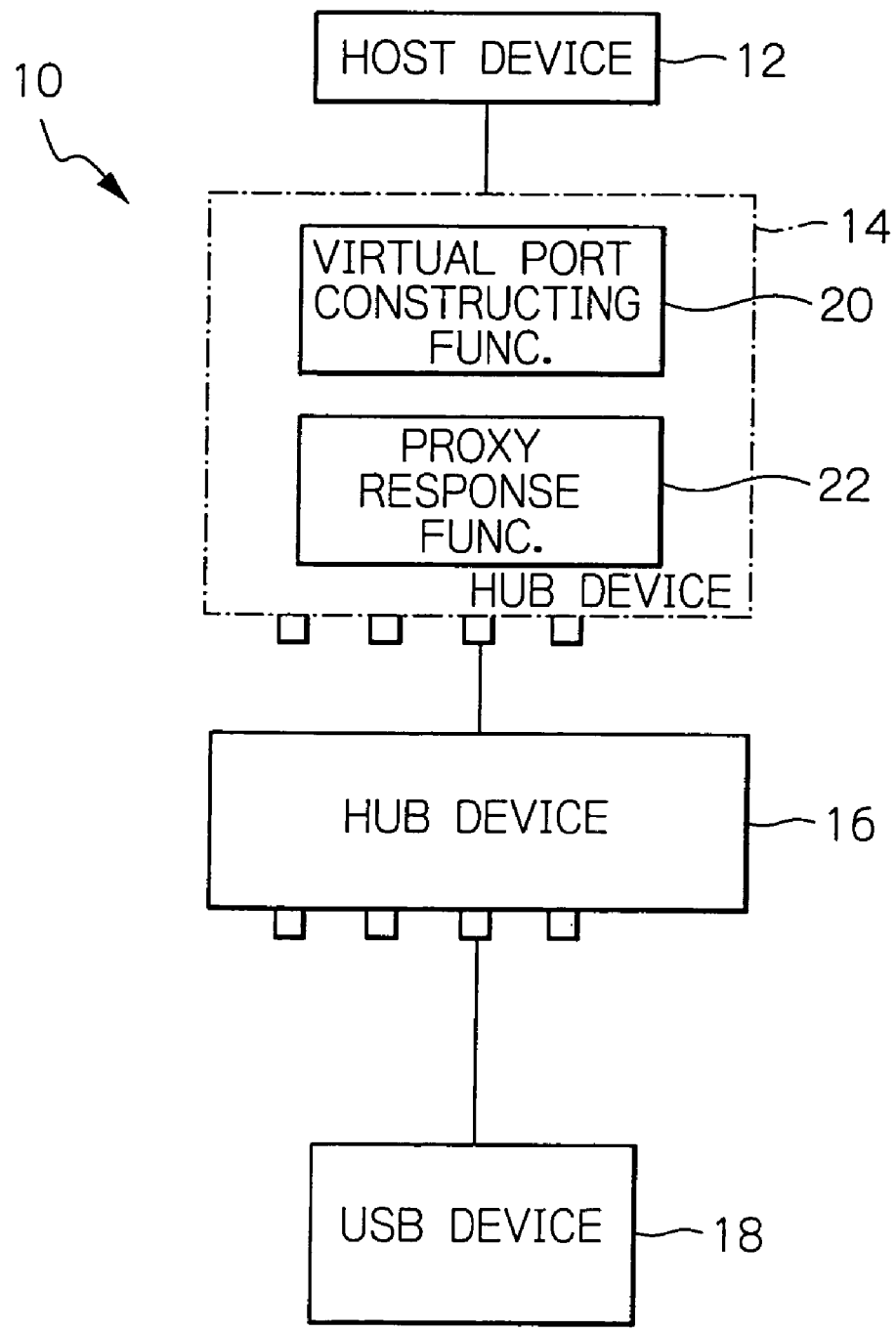
FIG. 1 is a schematic block diagram showing the connection topology of constituent elements in a bus communication system of the present invention as applied to a USB system.

Referring to the drawings, preferred embodiments of a bus communication system according to the present invention will be described in detail. In the present embodiment, the bus communication system of the present invention is applied to a USB system 10. The portions not directly relevant to understanding the present invention are neither shown nor described. In the following description, a signal is designated with the reference numeral of a connection on which the signal appears.

Referring to FIG. 1, the USB system 10 includes a host device 12, hub devices 14 and 16 and a USB device 18 interconnected as illustrated. In the USB system 10, the host device 12, the hub devices 14 and 16 and the USB device 18 are interconnected in cascade as devices of respective tiers provided for under the USB standard. The host device 12 exhibits universality as a usual personal computer and also exhibits the USB function.

The hub devices 14 and 16 are each a line concentrating and switching device of the USB standard having plural ports. The hub device 14 has a virtual port constructing functional unit 20 and a proxy response functional unit 22. In the present embodiment, the hub device 14 has a third port connected to the hub device 16.

In terms of the connection topology of the instant embodiment, the function of the virtual port constructing functional unit 20 is to construct virtual ports by software, which are not actual, physical ports, in the hub device 14, pursuant to the connection of the USB device 18 to the hub device 14. The function of the proxy response functional unit 22 is to respond to a device of the USB standard, located on the upstream side, in deputy for the device of the USB standard located in the lower tier. The device of the USB standard, located on the upstream side, is not limited to the host device 12.

Figure 2:
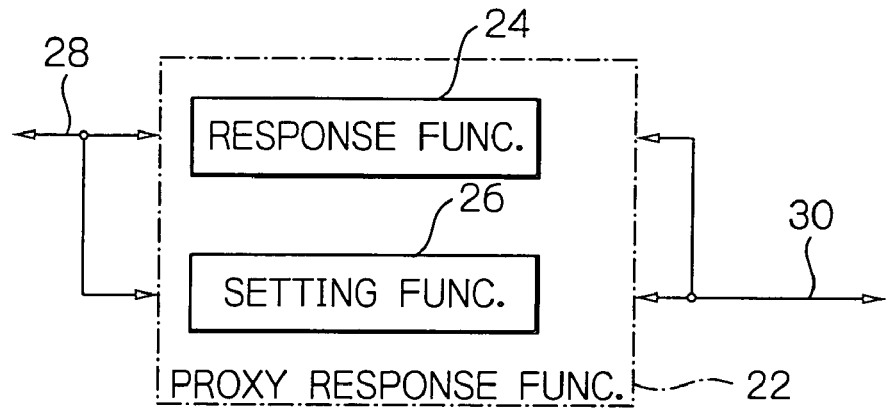
FIG. 2 is a schematic, functional block diagram illustrating an inner configuration of the proxy response functional unit shown in FIG. 1.

The proxy response functional unit 22 includes a response functional unit 24 and a setting functional unit 26, as shown in FIG. 2. The response functional unit 24 functions as operating as if the USB device 18 is connected to a virtual port to respond to communication from the host device 12. The setting functional unit 26 functions as establishing the bus connection to the USB device 18. The proxy response functional unit 22 has communication 28 with the host device 12, while also having communication 30 with the USB device 18, connected to the virtual port, in order to act as an arbitrator or proxy between both devices.

In general, the hub device has the function of recording the attachment and detachment of another device of the USB standard relative to the ports of the hub device, although such function is not shown. The attachment and detachment are recorded with status bits owned by the hub device. The host device 12 references the status bits to recognize the connecting state of the hub device. For example, if a new USB device is connected to the USB system 10, the host device 12 allocates an intrinsic device address to the newly connected USB device and communicates with the newly connected USB device through this device address. When the new USB device 18 is connected to the hub device 16, as in the present embodiment, the USB device 18 is similarly supervised by the host device 12. Moreover, when the USB device 18 is detached from the third port of the hub device 16, the hub device 16 sends to the host device 12 a notification to the effect that the USB device 18 has been detached from the third port of the hub device 16. The host device 12 invalidates the port of the hub device 16.

The USB device 18 is also of the USB standard. Among the USB devices, there are currently such devices as a hub type of keyboard, mouse, joystick, printer, modem, terminal adapter and loudspeaker.

In the present embodiment, the hub device 14 includes the virtual port constructing functional unit 20 and the proxy response functional unit 22. However, the hub device 16 and/or the USB device 18 may also include both of the functions.

Figure 3:
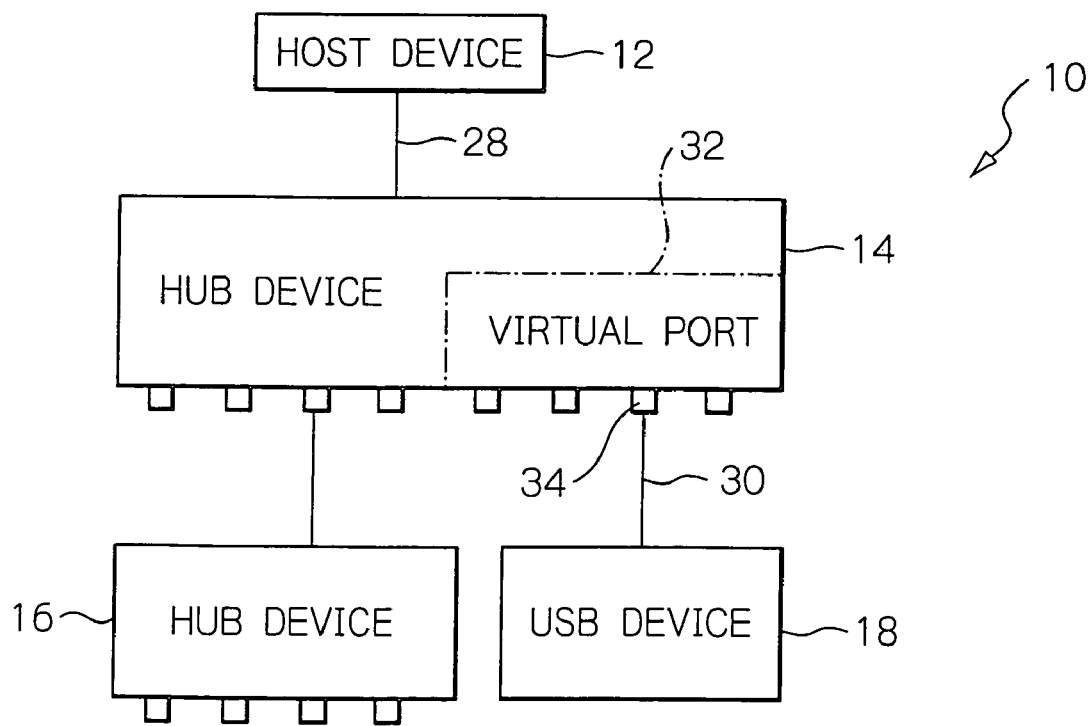
FIG. 3 is a schematic block diagram illustrating the functional connection topology attendant on the construction of the virtual ports in the USB system of FIG. 1.

By virtue of the aforementioned connection, the USB system 10 constructs a virtual port in the hub device 14. The connection topology in the USB system, attendant on the construction of a virtual port, is shown in FIG. 3. The hub device 14 verifies whether or not the current operating condition is matched to the condition of actuating the virtual port constructing functional unit 20 as shown in FIG. 1. If the current operating condition is matched to the constructing condition, the virtual port constructing functional unit 20 is actuated to construct a virtual port. The connection topology in which the hub device 14 is connected to the hub device 16 and the USB device 18 is connected to the hub device 16 is one of the above constructing conditions.

Once the virtual port 32 is constructed, the hub device 14, which in actual has the first to fourth physical ports to keep up the connection topology, acts with respect to the USB device 18 of the present embodiment as if it has the fifth to eighth virtual ports connected downstream of the hub device 16. In the hub device 14 of the illustrative embodiment, the USB device 18, connected to the hub device 16, is connected to the seventh port 34 of the virtual port 32.

Thus, even though the actual connection is as shown in FIG. 1, the USB device 18 may be handled as if it has been connected to the hub device 14, by the virtual port constructing functional unit 20 constructing the virtual port 32. By doing so, the hub device 16 does not have to take the USB device 18 into account. With the host device 12, the number of the tiers of connection, which is based on the virtual port constructing functional unit 20 of the hub device 14, may be equal to or more than seven.

Meanwhile, no limitations to the number of ports N of the hub device are regulated in the USB standard. In the USB system 10 of the instant embodiment, the device of the USB standard, located on the upstream side of the hub device 14, is the host device 12. This USB device is not limited to the host but may also be a slave.

As indicated by the connection topology of the constituent elements of the present embodiment, if the upstream side device of the USB standard addresses the hub device 14, based on a specific request, the hub device 14 responds in a usual manner in accordance with the USB standard. In this connection topology, if the device of the upstream side USB standard has addressed the USB device 18, located on the downstream side of the hub device 14, based on the same request as above, the hub device 14 establishes the functions of constructing and connecting the virtual port and of performing the proxy response, provided from the outset in the virtual port constructing functional unit 20 and in the proxy response functional unit 22, respectively. For assuring the operation without delay, it is desirable for the hub device 14 to verify the connection topology to set these functions in the operable state.

Several connection sequences, which are executed on connection of a new USB device to the USB system 10, will now be described. In these connection sequences, it will be described that the proxy response or echo function of the hub device 14 with respect to the USB device located on the upstream side plays a crucial role. The connection sequence of FIG. 4 covers the cases of connecting the hub device 16 to the hub device 14 and of connecting the USB device 18 to the hub device 16.

Initially, the USB system 10 is in such a state in which it includes both the host device 12 and the hub device 14, and in which the hub device 14 is already connected to the host device 12. At a time T10, the hub device 16 is newly connected to a downstream facing port of the hub device 14. If, in a state prior to this connection, the port of the hub device 14 remains unconnected, the signal line D+/D− is not higher than the lower threshold ($V_{IL}$), as a result of which the port appropriate therefor is in the SE0 (Single Ended zerO) state. This indicates the end of a packet, EOP (End Of Packet).

When the hub device 16 is newly connected to the port of the hub device 14, the signal line D+ is pulled up to not lower than an upper threshold value ($V_{IH}$). Based on this pull-up, the hub device 14 senses the port connection at a time T12 (report of device detection). The hub device 14 samples the state of the signal line to check, e.g. the speed of connection of the hub device 16. By continuation of the SE0 state, the hub device 14 resets the hub device 16. When this is viewed from the side of the hub state 16, the status transition mechanism (device state machine) of the hub device transfers from the connected (attached) state through a device setting (configuration) state to a powered state and further transfers to the steady (default) state by the resetting described previously.

It should be noted that the report of device detection is usually made by a control circuit of the hub device 14, not shown, notifying the host device 12 of the change in the status through an upstream facing port (report of device detection). The host device 12 also performs device initialization and resetting, referred to as bus connection setting (bus enumeration).

Figure 4:
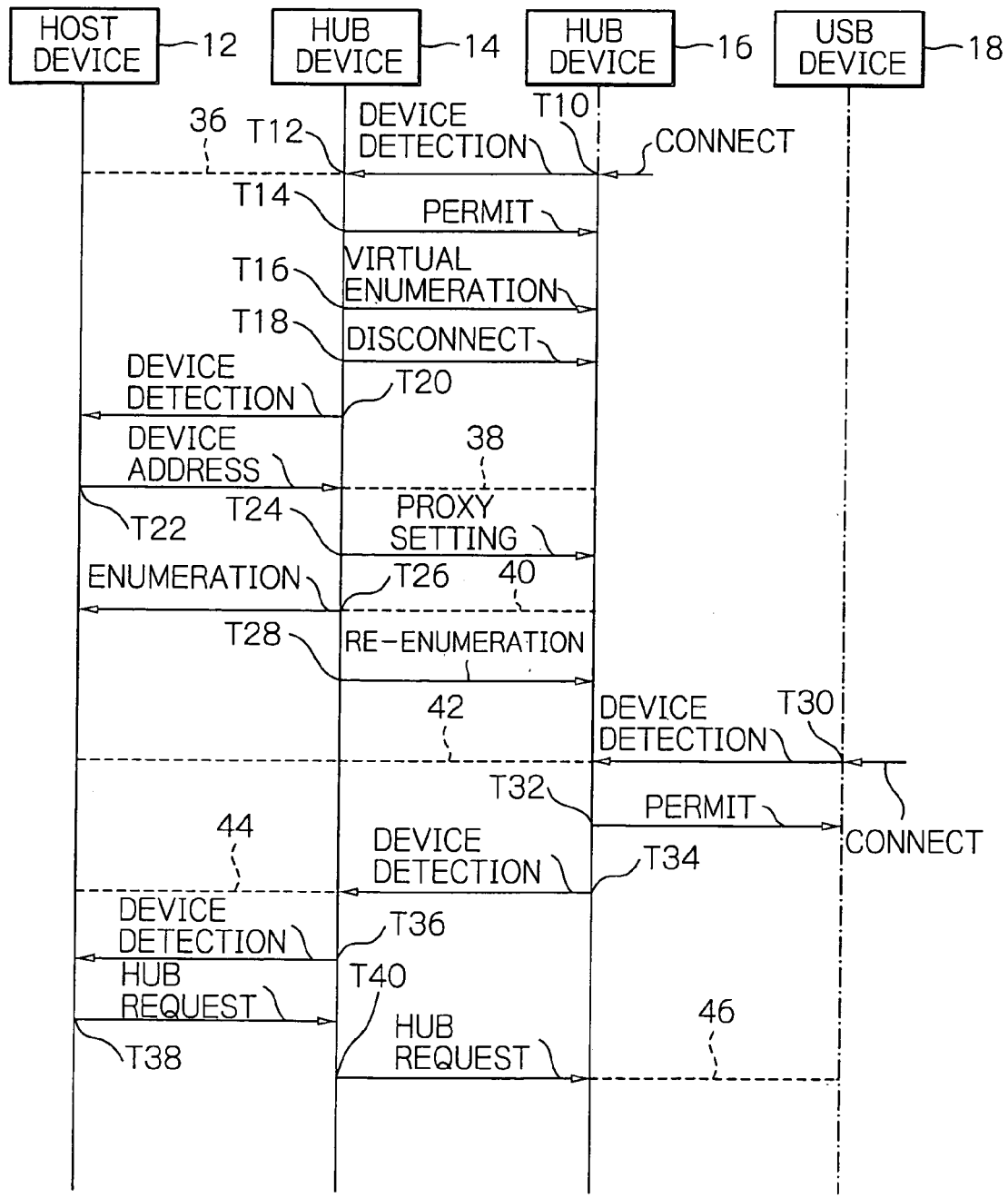
FIG. 4 is a sequence chart useful for understanding the sequence of the connection in the illustrative USB system.

However, as indicated by a broken line 36 in FIG. 4, the hub device 14 of the present embodiment does not make a report on device detection to the host device 12 but the hub device 14 itself executes the bus connection setting. This reason is that the turn-around time of the USB bus must be secured in consideration that there is an occasion where the limitation of the seven tiers as provided for in the USB standard is surpassed. In order to realize this, the hub device 14 in the present embodiment has a proxy response function for the host device 12.

At a time T14, the hub device 14 opens the downstream port to transfer the hub device 16 to the powered state. This opening of the port means that permission for communication has been accorded to the hub device 16.

Next, at a time T16, the hub device 14 commands bus enumeration to the hub device 16. This bus enumeration is herein termed virtual enumeration. By way of the bus enumeration, the hub device 16 executes device setting (configuration), verification of, e.g. the connection speed by resetting and verification of the power supply type. The device setting is made on the necessary power and the device address, while the verification of the power supply type is done on whether the hub device 16 is a bus-powered or a self-powered device. The virtual enumeration by these series of setting and judgment indicates that the hub device 14 has executed bus connection setting (bus enumeration) to take the place of the host device 12. In the hub device 14, the enclosed USB system software comprehensively monitors this bus connection setting.

In the present embodiment, the hub device 14 electrically disconnects the downstream facing port. This disconnection restores the hub device 16 from its default state to its powered state, in readiness for a successive bus connection setting.

Thus, the processing up to a time T18 is prepared for handling the hub device 16 as a device connected to the virtual port of the hub device 14. At a time T20, the hub device 14 is responsive to the completion of this preparation to make a report on detection of the hub device 16, as a USB device, to the host device 12 (report on device detection).

Upon receipt of this report, the host device 12 at a time T22 executes device setting (configuration) of the hub device 16, as a USB device, for the hub device 14. The device setting here means setting of, e.g. a device address. The device setting is not performed directly on the hub device 16, as described previously and shown by a broken line 38 in FIG. 4. The hub device 14 monitors the commands from the host device 12 to secure the device setting.

At a time T24, the hub device 14 acts as a proxy for the host device 12 to set, e.g. a device address for the hub device 16 (proxy setting). The hub device 16 also does not perform bus enumeration, as indicated with a broken line 40. In its stead, the hub device 14 at a time T26 issues a proxy response to the host device 12 in connection with bus connection setting (enumeration).

Moreover, based on the information accorded to the hub device 16 by proxy setting, the bus device 14 at a time T28 performs second bus setting for the hub device 16 by proxy response. This bus connection setting is termed re-enumeration. The re-enumeration differs from the provisional enumeration in that the hub device 16 is handled not as a simple USB device but as a hub device.

By this procedure, the hub device 14 acts as a deputy for the hub device 16 in effecting bus enumeration for the host device 12. At this time, the hub device 14 acts relative to the host device 12 as if the hub device 16 as the USB device has been connected to its virtual port. In the present embodiment, the USB device 18 of FIG. 1 is actually connected to the third port of the hub device 16. However, the hub device 14 reports to the host device 12 that the USB device has been connected to the seventh port of the virtual port 32 constructed in keeping with the connection shown in FIG. 3.

At a time T30, the USB device 18 is connected to the port of the hub device 16. The USB device 18 primarily should take the procedure of reporting the device detection to the host device 12 through the hub devices 16, 14. However, this report is not made, as indicated by a broken line 42. The report on device detection is simply made to the hub device 16. The hub device 14 sets bus connection for the USB device 18, as will be described later.

At a time T32, the hub device 16 opens the downstream facing port to accord permission for communication to the device 18. Thereafter, at a time T34, the hub device 16 newly reports device detection to the host device 12, connected to its upstream facing port, as will be described later. In this case, the hub device 16, connected to the USB device 18, does not make direct report on device connection, as may be seen from a broken line 44. At a time T36, the hub device 14 newly reports device detection to the host device 12.

On receipt of the report on detection, the host device 12 outputs a hub request to the hub device 14, at a time T38, to supervise the virtual port. Responsive to the hub request, the hub device 14 itself outputs a hub request to the hub device 16 to thereby supervise the port connected to the USB device 18. The hub device 16 does not effect port management, as indicated by a broken line 46. In actual, the hub device 14 receives data used for virtual port management of the USB device 18, from the hub device 16, by an interrupt transfer, to supervise the virtual port by control transfer to the USB device 18.

In summary, by constructing the virtual port and responding in the proxy, the hub device 14 takes the role of a host to eliminate the problem of delay time or turn-around time, accrued from the provisions of the USB system 10, as well as to enable free or unstrained connection and to improve the communication efficiency.

Figure 5:
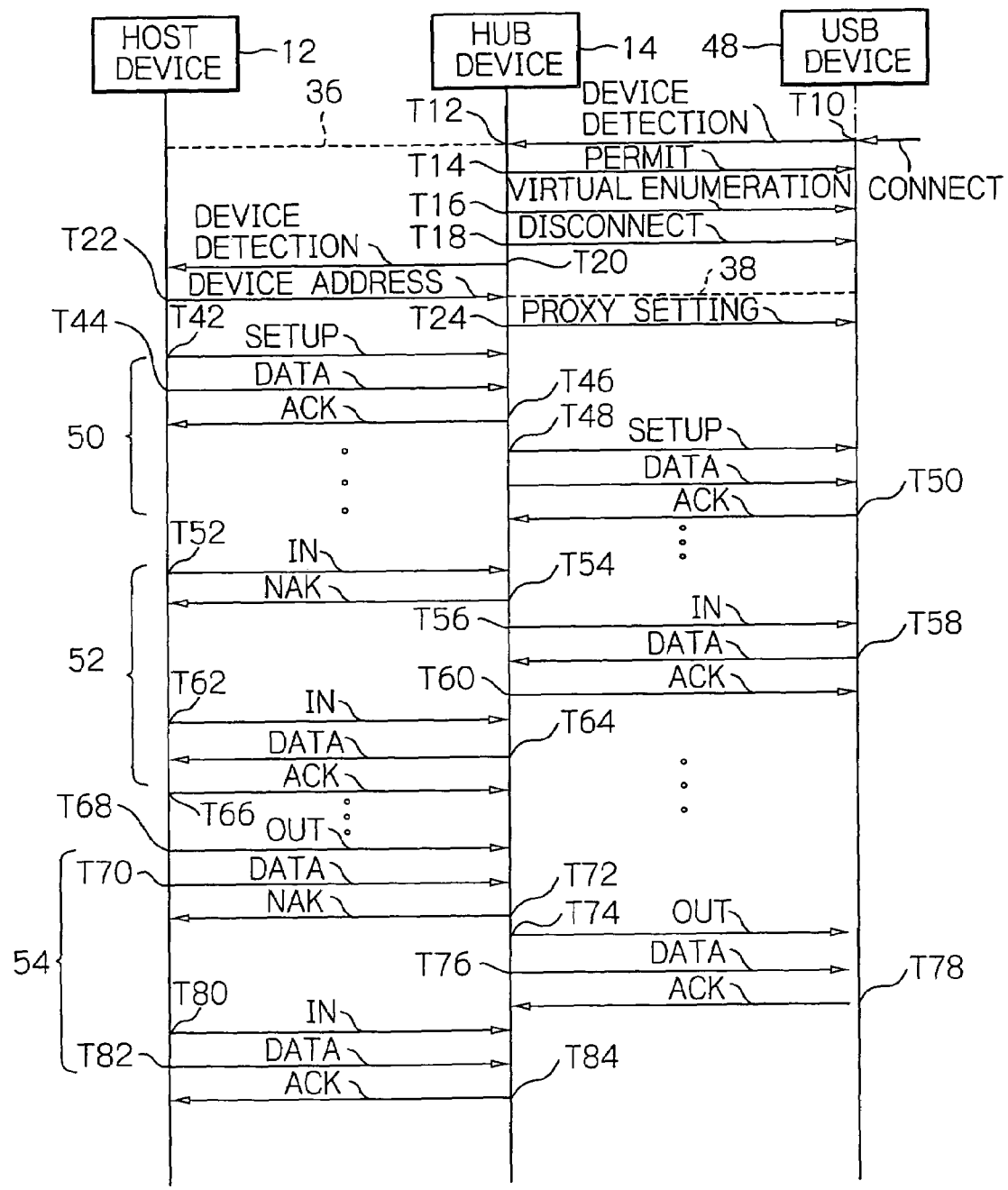
FIG. 5 is a sequence chart also useful for understanding in particular the enumeration and re-enumeration procedure in the connection procedure in the USB system.

Referring to FIG. 5, the case in which a USB device 48 is connected to a virtual port of the hub device 14 and, in particular, the sequence of re-enumeration, will now be described in detail. The hub device 14 includes the virtual port constructing functional unit 20 and the proxy response functional unit 22, as shown in FIG. 1. This connection sequence basically performs the same processing as that from time T10 to time T24. The portions similar in operation to those of FIG. 4 are depicted by the same reference numerals and the corresponding description will be omitted for avoiding the redundancy.

In consideration of congruency of description, the description will now be made as from the time T22 of enumeration. In setting a device address for the hub device 16 as the USB device, the host device 12 does not directly perform device setting, as indicated by a broken line 38 in FIG. 4. The hub device 14 monitors a command from the host device 12 to acquire the information of the device setting (configuration) and, at a time T24, the hub device 14 effects proxy setting of, e.g. a device address.

At a time T26, the hub device 14 issues a proxy response as to bus connection setting (bus enumeration) to the host device 12, to take the place of the USB device 48. The host device 12 sets bus connection through the proxy response (echo) of the hub device 14 to the USB device 48 (re-enumeration). This setting is equivalent to the response to the USB device 48. This proxy response and details of the response will be described with reference to FIG. 5. This bus enumeration is executed by control transfer, which is basically classified into three transactions 50, 52 and 54.

The transactions mean the scheduling units of the host device 12. The setup transaction 50, used for determining the type of control transfer, determines that, for example, the transfer form is the write or read-in transfer.

Specifically, the host device 12 sends out a SETUP packet to the USB device 48, at a time T42 in FIG. 5, and subsequently a DATA packet at a time T44 to the USB device 48. The hub device 14 at a time T46 in turn sends out an ACK (ACKnowledgement) packet to the host device 12 by way of proxy response (echo). By this proxy response of the hub device 14, the host device 12 construes that the USB device 48 has recognized, e.g. the setup form.

In actual, the hub device 14 at a time T48 sends out a SETUP packet to the USB device 48, and subsequently a DATA packet at a time T50. The USB device 48 at a time T52 is responsive to a receipt of the DATA packet to return an ACK packet to the hub device 14. By this response, the hub device 14 comprehends that the USB device 48 has received the packets.

An IN transaction 52 is repeatedly carried out in the case of read-in transfer. When the host device 12 at a time T52 sends out an IN packet to the USB device 48, the hub device 14 at a time T54 returns a NAK (Negative AcKnowledgement) packet to the host device 12, by way of a proxy response (echo). By this proxy response, the host device 12 construes that USB device 48 is not ready. In actual, the hub device 14 thereafter (at a time T56) directly forwards an IN packet to the USB device 48. The USB device 48 at a time T58 is responsive to this IN packet to deliver the DATA packet to the hub device 14, which at a time T60 is responsive to a receipt of the DATA packet to return an ACK packet. This informs the USB device 48 that the hub device 14 has received the data.

If the host device 12 at a time T62 re-sends out the IN packet to the USB device 48, the hub device 14 at a time T64 is able to transmit the DATA packet, received from the USB device 48, to the host device 12. Upon receipt of the packet, the host device 12 returns an ACK packet to the hub device 14 at a time T66. This informs the hub device 14 that the host device 12 has received the data.

Finally, an OUT transaction 54 is repetitively carried out in the case of write transfer. The host device 12 at a time T68 sends out an OUT packet to the USB device 48. If the host device 12 at a time T70 issues a DATA packet to the USB device 48, the hub device 14 at a time T72 makes a proxy response to return a NAK packet to the host device 12. By this proxy response, the host device 12 comprehends that the USB device 48 is not ready. In actual, the hub device 14 thereafter (at a time T74) directly transmits an OUT packet to the USB device 48. The hub device 14 at a time T76 sends out a DATA packet to the USB device 48. Responsive thereto, the USB device 48 at a time T78 returns an ACK packet to the hub device 14. This informs the hub device 14 of a receipt of the sent-out data by the USB device 48.

Thereafter, at a time T80, the host device 12 again sends out an OUT packet to the USB device 48. At a time T82, a DATA packet is sent out from the host device 12. Since the hub device 14 has already received an ACK packet from the USB device 48, the hub device 14 is able to return an ACK packet at a time T84 to the host device 12 to take the place of the USB device 48. This informs the host device 12 that the USB device 48 has received the sent data.

In this manner, the USB device 48 is connected to the virtual port by effectively utilizing the function provided to the hub device 14, the hub device 14 thus acting by deputy for the USB device 48 in making a response, so that processing can be completed in a shorter time than is prescribed in the USB standard.

A data transfer processing apparatus, described in a Japanese Patent Laid-Open Application No. 2002-288112, is referred to as a comparative example of short time processing in data transfer operations. This data transfer processing apparatus is of a feature that a board associated with broadcast can be set in a shorter time.

The access according unit accords a permission to accessing to a data storage unit when a broadcast enabling signal and a broadcast signal are used and when a board ID (IDentification) and broadcast signal are used, such that, when a data address of the data storage unit points to a storage location of the broadcast address storage unit, access is allowed for the broadcast address storage unit to output a select signal and an address to set the prescribed information. Although this Publication may be analogous to the present invention only in shortening the setting time, no mention is made of the proxy response (echo) function of the instant embodiment.

Figure 6:
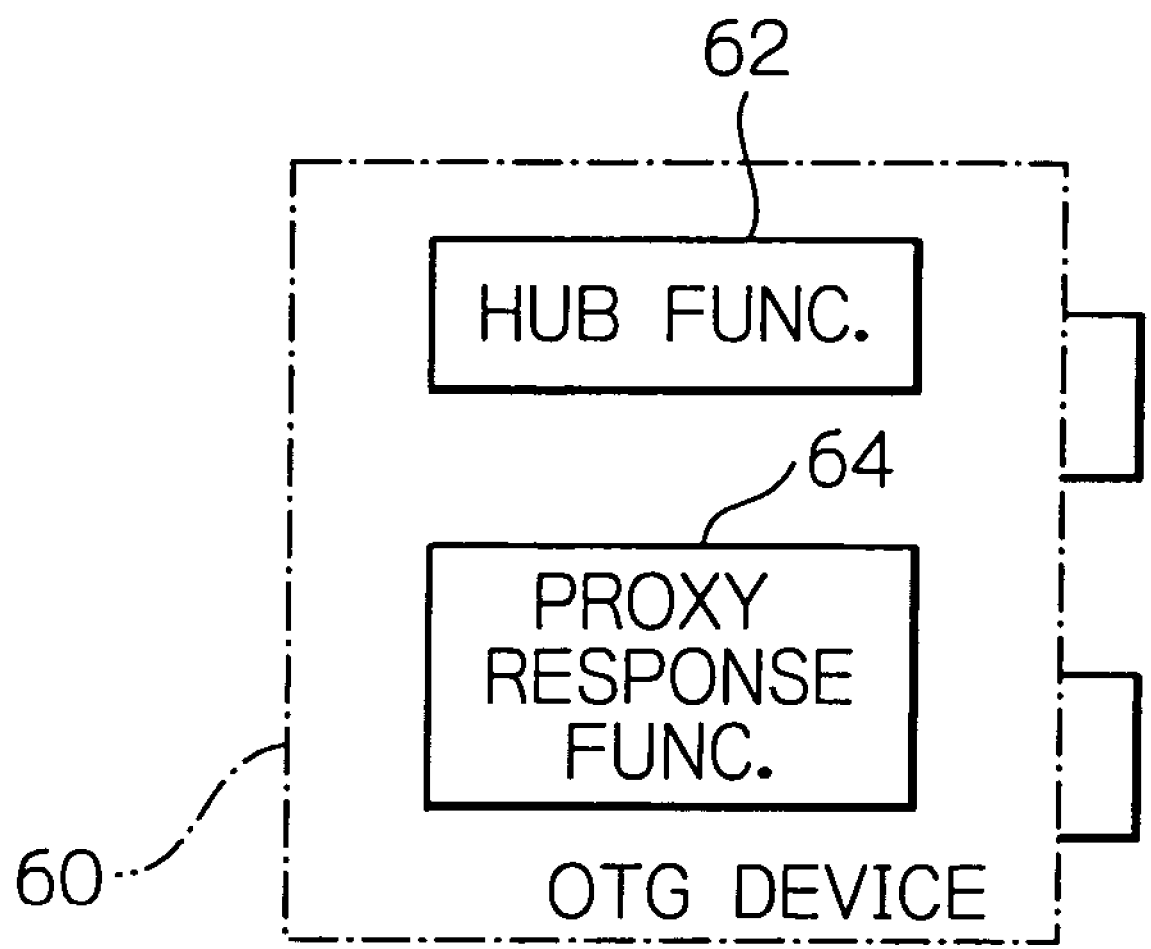
FIG. 6 schematically shows functional blocks contained in an OTG device operating under the USB-OTG standard.

Another embodiment of the USB system 10 will now be described with reference to FIG. 6. The USB system 10 of the instant embodiment includes an OTG device 60, which is in meeting with the USB-OTG standard. The OTG device 60 includes a hub functional unit 62 and a proxy response functional unit 64, as shown in FIG. 6. The hub functional unit 62 serves to connect to and relay the device on the downstream side to concentrate the associated lines. As this function is established, the hub functional unit 62 also has the function of transferring and arbitrating the communication between different networks. The proxy response functional unit 64 has the responding function to take the place of the device on the downstream side, as described previously. The proxy response functional unit 64 would be similar to the hub functional unit if the proxy were deemed as arbitration. However, both are definitely different.

Figure 7:
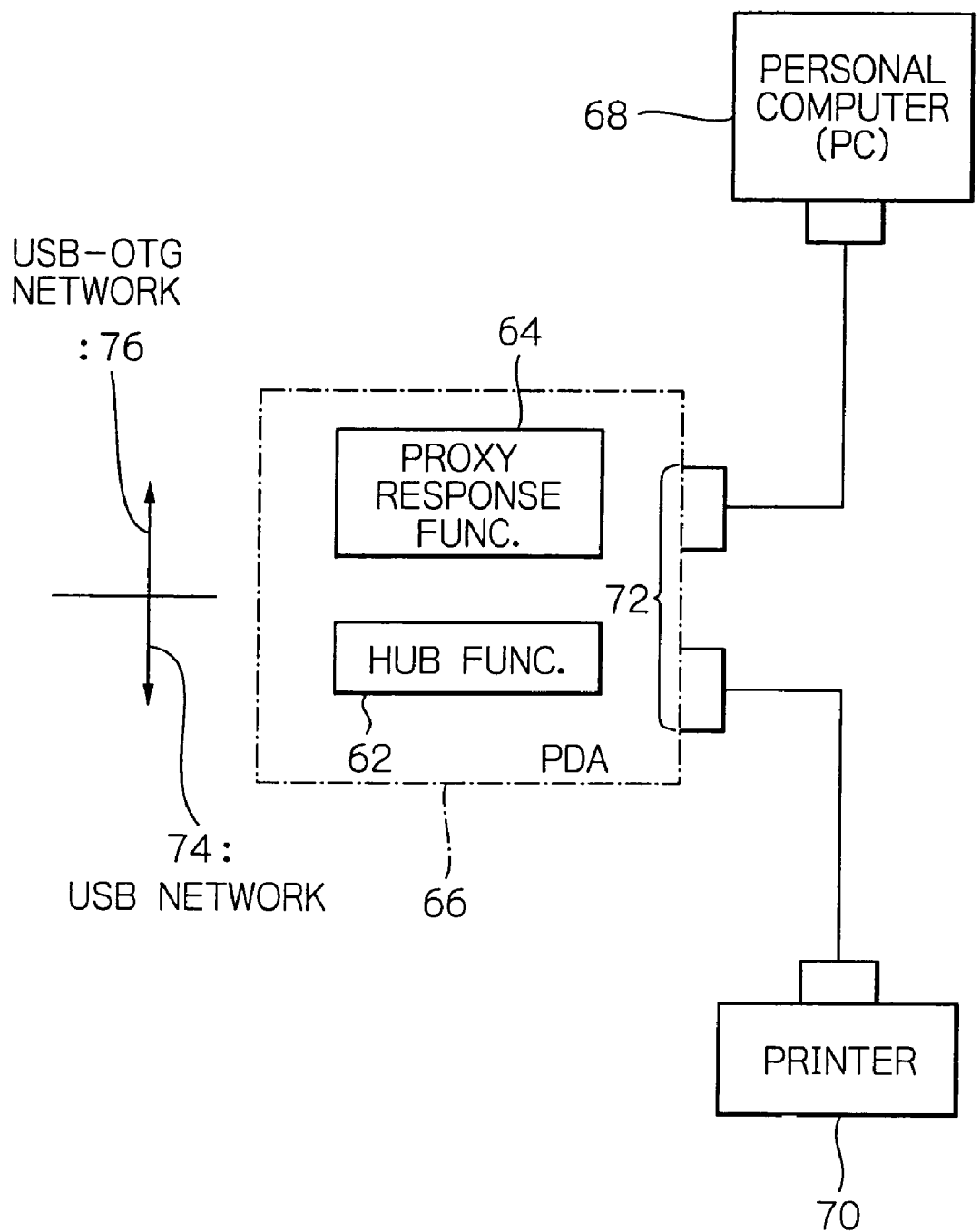
FIG. 7 shows the connection topology of the PDA involved in a network of a standard different from the USB standard and the OTG standard.

In the present embodiment, the OTG device 60 is applied to a PDA 66 as one of the USB-OTG portable device; as illustrated in FIG. 7. This PDA 66 is connected to a personal computer 68 and to a printer 70. The PDA 66 is a dual-role device having a mini-AB receptacle or connector 72 into which can be inserted both plugs connecting to the host side and to the slave side under the USB-OTG standard. Such a USB-OTG portable device also encompasses a DSC (digital still camera) without being limited to the PDA.

The personal computer 68 is usually provided as an A-device of the host. In this case, the mini-A plug is used. The printer 70 is arranged as a slave device. The mini-B plug is used in meeting with the slave device.

When printing data are supplied from the PDA 66 to the printer 70, and the PDA 66 and the printer 70 constitute a usual USB network 74, the PDA 66 may use the USB printer driver included therein. Specifically, if the PDA 66 is operating as a host, up to 127 USB devices, such as printer 70, may be connected to the downstream side and controlled in a usual fashion.

If the personal computer 68 is a notebook type of dual-role device, the personal computer 68 and the PDA 66 make up an OTG-USB network 76, in which case the HNP (Host Negotiation Protocol) is used. However, the OTG-USB network 76 is distinct from the USB network 74 including a printer. It is therefore impossible to send out printing data from the personal computer 68 to the printer 70 using a USB printer driver enclosed in the PDA 66. Thus, if the PDA 66, as an OTG device, is operating simply as a USB device, specifically, not as a host, the PDA 66 by the above-mentioned hub function arbitrates or transfers the communication from the personal computer 68 to the printer 70, as a USB device connected on the downstream side of the PDA 66, with the personal computer 68 as a host. The hub function is similar to the proxy response function.

Figure 8:
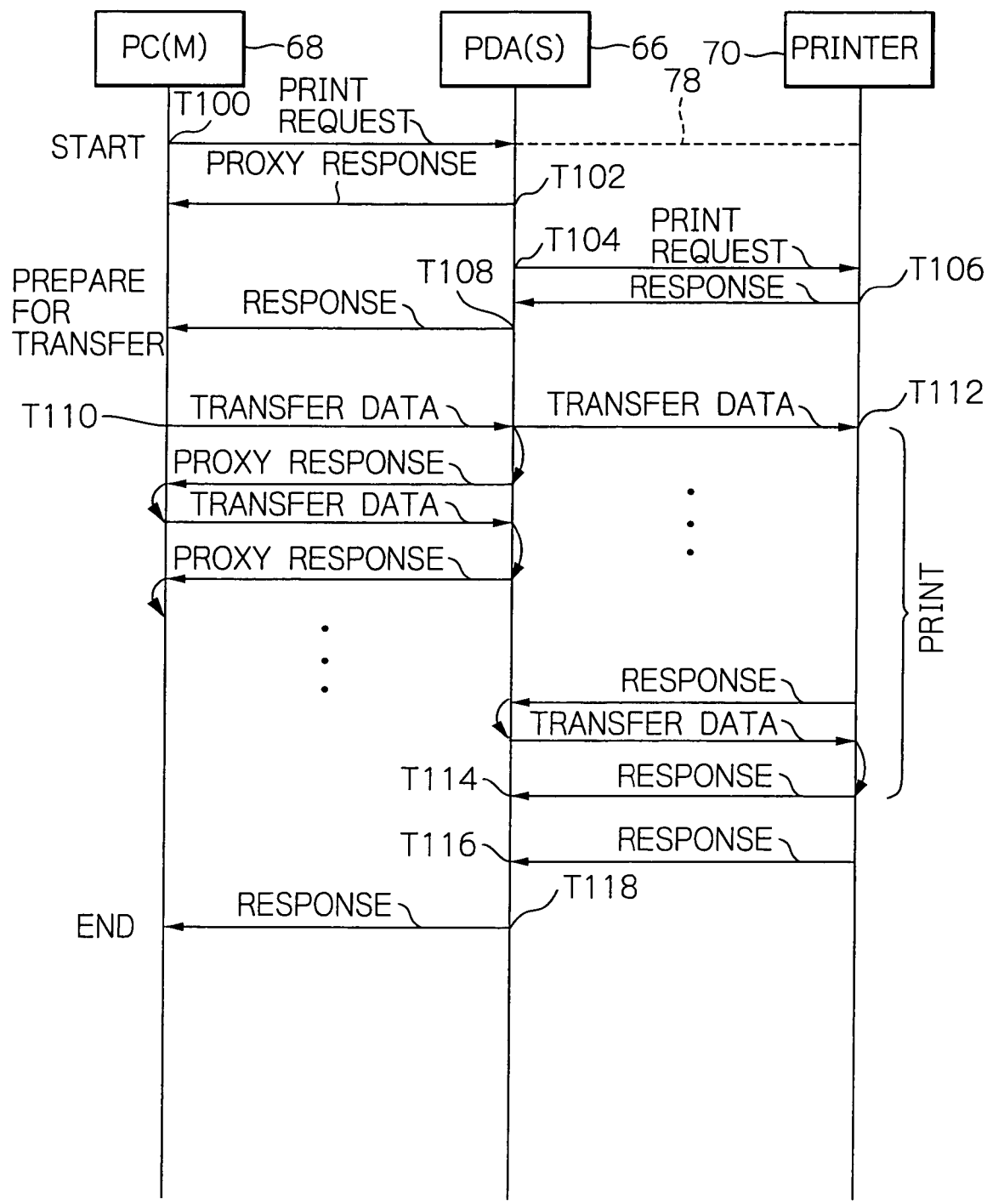
FIG. 8 is a sequence chart useful for understanding the connection sequence where the PDA operates as a slave in the connection topology shown in FIG. 7.

The operation between hybridized networks will be described, in which a USB-OTG network 76 and USB network 74 are connected together In the present embodiment, the personal computer 68 as a master or a host and the PDA 66 as a slave form the USB-OTG network 76, while the PDA 66 and the printer 70 as a USB-OTG device form the USB network 74. FIG. 8 shows the sequence of using the printer 70 by the personal computer 68. In this case, five or more tiers of the hub devices may be connected to the PDA 66, while six or more tiers of the USB-OTG devices may be connected to the personal computer 68 in the USB-OTG network 76.

The aforementioned master "M" is a device playing the role of a host in the USB-OTG network 76, while the slave "S" is a device playing the role of a USB-OTG device in the USB-OTG network 76. The roles of the master and the slave may be dynamically or adaptively changed in the USB-OTG network 76.

If the personal computer 68 at the time T100 issues a print request signal, specifying the start of the printing, to the printer 70, the PDA 66 attempts to make a proxy response. Thus, the print request signal does not directly reach the printer 70, as indicated by a broken line 78 of FIG. 8. The PDA 66 of the illustrative embodiment, which is the OTG device, as shown in FIG. 7, has the hub functional unit 62. Thus, the PDA 66 monitors the device address supplied and, when it is found that the device address specifies a USB-OTG device connected to a downstream facing port of the PDA 66, the PDA 66 issues a response (echo) in place of the USB-OTG device in order to secure the turn-around time of the USB bus relevant to the seven-tier limitations.

It is noted that the print request takes the form of I/O request with the address of the printer of the personal computer 68 acting as a master, as a USB-OTG device address. Specifically, a device request is made by the setup transactions of the control transfer. The printer 70 is not ready to immediately respond to this request. The PDA 66 detects the I/O request, based on the function of the hub functional unit 62 and, based on this detection, issues a NAK handshake packet to the personal computer 68 at a timing T102 to issue a proxy response to the I/O request. The NAK packet is of a handshake indicating that transmission or reception cannot be made due to, e.g. processing going on.

The print request of the personal computer 68 is usually notified at a time 104 to the printer 70 as a print request by the PDA 66 itself. The PDA 66 at a time 106 is responsive to the response to the printer 70 and directly sends out this response at a time T108 to the personal computer 68. The personal computer 68 then starts the preparation for transfer. As from a time 110, the personal computer 68 directly performs a bulk transfer of customarily repeating OUT transactions with the printer 70 as a device address. By doing so, the printing data are forwarded through the PDA 66 to the printer 70. As from an initial time T112 when the printer 70 has received the data transferred, the printer commences warming-up of the printer. The PDA 66 continues to make proxy responses to the personal computer 68 with NAK handshake packet until the warmed-up temperature is reached.

However, actual data transfer in the present embodiment is indirectly performed to the printer 70 in the form of an I/O request by no other than the PDA 66. On detection of the bulk transfer based on the hub function, the PDA 66 issues an ACK handshake packet to the personal computer 68 in the course of the bulk transfer to make proxy response to the OUT transactions. Consequently, the personal computer 68 and the PDA 66 repeatedly issue OUT transactions and ACK handshake packets, that is, the personal computer 68 and the PDA 66 repeat the loop of operation.

On the other hand, if the printer 70 has already issued ACK handshake packets, the PDA 66 has already completed a proxy response to the personal computer 68. The response is checked solely by the PDA 66. As a consequence, the PDA 66 and the printer 70 repeatedly issue OUT transactions by the PDA 66 and ACK handshake packets, thus forming looped transfer operations. It is noted that the data transfer, repeated in the form of loop, is not executed in a lump but, in its stead, is executed by repeating, e.g. the proxy response for each I/O request, as shown in FIG. 5.

The PDA 66 detects the last ACK packet supplied from the printer 70 at a time T114. Upon receipt at a time T116 of a notice on the end of the printing processing, the PDA 66 at a time T118 again sends out the end notice to the personal computer 68.

Meanwhile, an event in the printer 70, such as paper sheet depletion, may occur in the interim. If the printer 70 notifies the PDA 66 of the occurrence of such an event by an interrupt transfer, this notification is directly passed through the PDA 66 to the personal computer 68.

By this operation, the USB devices may be controlled from a master even if plural networks of different USB standards exist together. Specifically, printing may be made by controlling the printer from the personal computer 68, as in the present embodiment.

Figure 9:
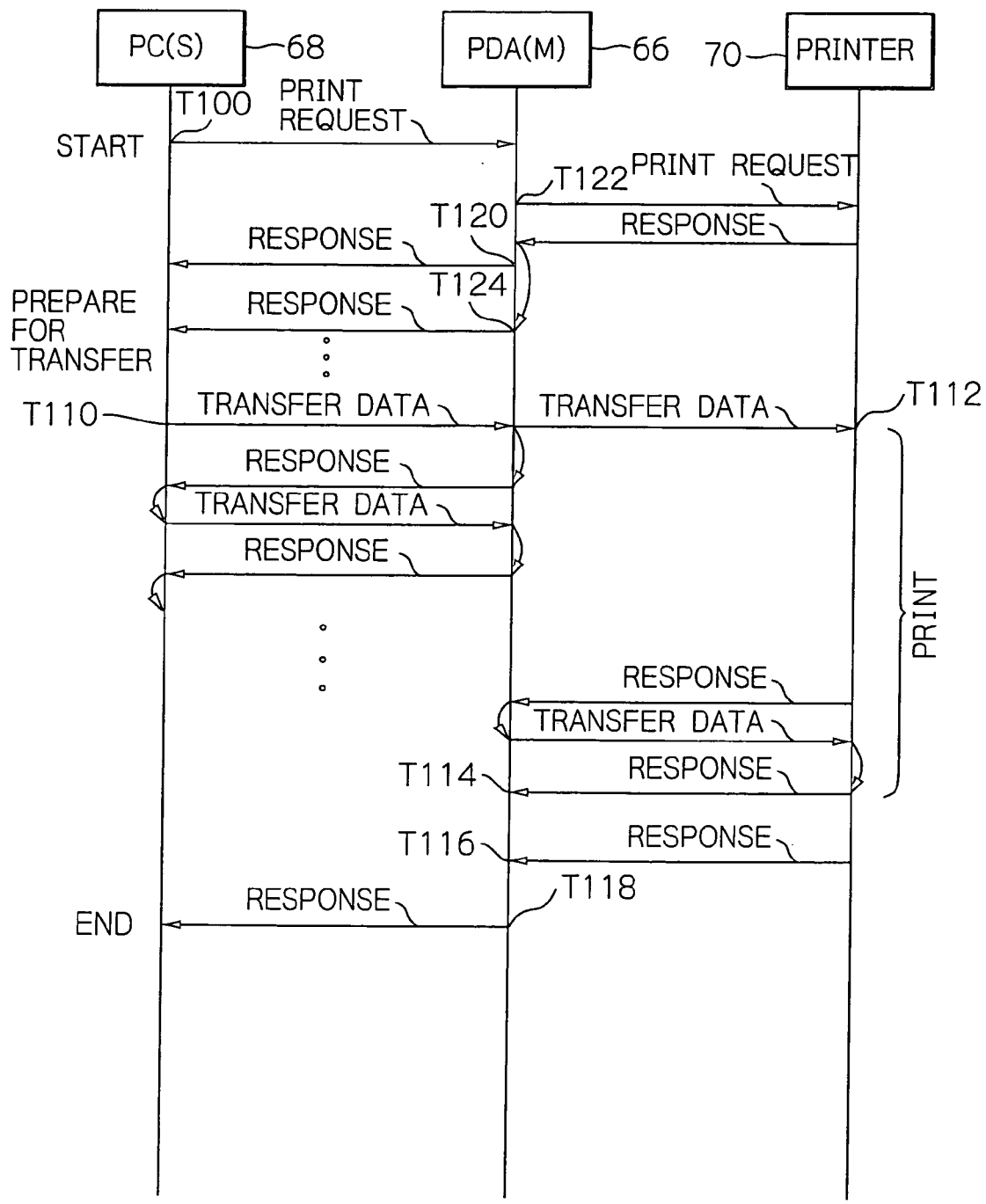
FIG. 9 is also a sequence chart useful for understanding the connection sequence where the PDA operates as a master in the connection topology shown in FIG. 7.

It has already been indicated that the relationship between a master and slaves in the USB-OTG standard in the USB-OTG devices arranged in the USB-OTG network 76 is not limited to that described with reference to the embodiment. FIG. 9 shows the operating sequence when the personal computer 68 is a slave "S", the PDA 66 is a master "M", and a USB network 74 is formed by the PDA 66 and the printer 70. The present embodiment differs from FIG. 8 in that the PDA 66 is a master and hence does not have to make proxy response. The PDA 66 does not have to make proxy response, to take the place of the USB-OTG device connected to its downstream facing port in order to secure the turn-around time of the USB bus concerning the seven-tier limitations, but it is only sufficient for the PDA to receive direct response from the USB-OTG device having the hub functions. However, this response itself may generally be a proxy response.

In this manner, if the PDA 66 is a slave, it is desirable to set the PDA 66 with five or more tiers, to which may be connected the hub device or the printer 70, based on the construction and connection of the virtual ports and the function of the proxy response. If the PDA 66 is a master, as shown in FIG. 9, it is desirable to set the PDA 66 with five or more tiers, to which may be connected the hub device or the printer 70, based on the functions of construction and connection of the virtual ports.

If the personal computer 68 at the time T100 produces a print request to a printer, in order to start printing, a printing request is generally made to the PDA 66 of the master in FIG. 9. The PDA 66 at a time 120 makes a response to this print request. The PDA 66 at a time 122 notifies the printer 70 of the print request of the personal computer 68, based on the hub function, and awaits its response. If the printer 70 is not ready to respond to this request instantly, a response indicating that state is sent to the PDA 66. When ready for printing, the printer 70 makes a response showing the readiness to the PDA 66. The PDA 66 at a time T124 develops a response associated with the completion of preparation for printing to the personal computer 68. However, also in customary in many cases, the bulk transfer of directly performing repetitive OUT transactions with the printer 70 taken as a device address causes printing data to be transferred to the printer 70.

The processing successive thereto will be the same as the preparation for transfer and the procedure following it shown in FIG. 8. When informed that the printer 70 is ready for printing, the printer 70 prepares for transferring data. The personal computer 68 effects bulk transfer to send out printing data used for printing to the printer 70. In the interim, the PDA 66 receives a bulk transfer of data to issue an ACK handshake packet, that is, returns a response signal, to the personal computer 68. The data transfer and the issuing of the ACK handshake packet are repeated as in the previous embodiment. This data transfer is made from the PDA 66 to the printer 70, based on the hub function owned by the PDA 66. In the interim, the printer 70 responds by issuing an ACK handshake packet. Here again, the OUT transactions and the issuing of the ACK handshake packets are repeated. The printer 70 executes the printing.

It should be noted that the data transfer, repeated here in a similar manner, is not performed in a lump but by repetition of proxy responses whenever an I/O request is made, as understood from FIG. 5.

The PDA at a time T114 detects the last ACK handshake packet of the printer 70. The PDA then at a time T116 is notified of the end of the printing. In the interim, an event such as paper sheet breakage may occur, as mentioned previously. When the printer 70 informs the PDA 66 of such an event by interrupt transfer, this notification is temporarily made to the PDA 66 acting as a master and thence transmitted via PDA 66 to the personal computer 68.

Since the PDA 66 is a master, the printing in the printer 70, present in a different network, may be carried out by simply adding the hub function. When the PDA 66 is a master in the master/slave relationship of the USB-OTG network 74, such a merit is obtained that the PDA 66 does not have to make proxy response to the personal computer 68.

The communication method in the connection will now be described where plural networks exist together as shown in FIG. 7. This communication method does not simply arbitrate communication from the host to the USB-OTG device 60, specifically to the USB-OTG device connecting to the downstream side of the PDA 66. The communication method consists in the PDA 66 issuing an independent request in a USB network 76, including the PDA 66, as a channel separate from the USB-OTG network 74 including the host, to execute multi-tasking in a manner sharing or dividing the task of the host of the USB-OTG network 74.

Figure 10:
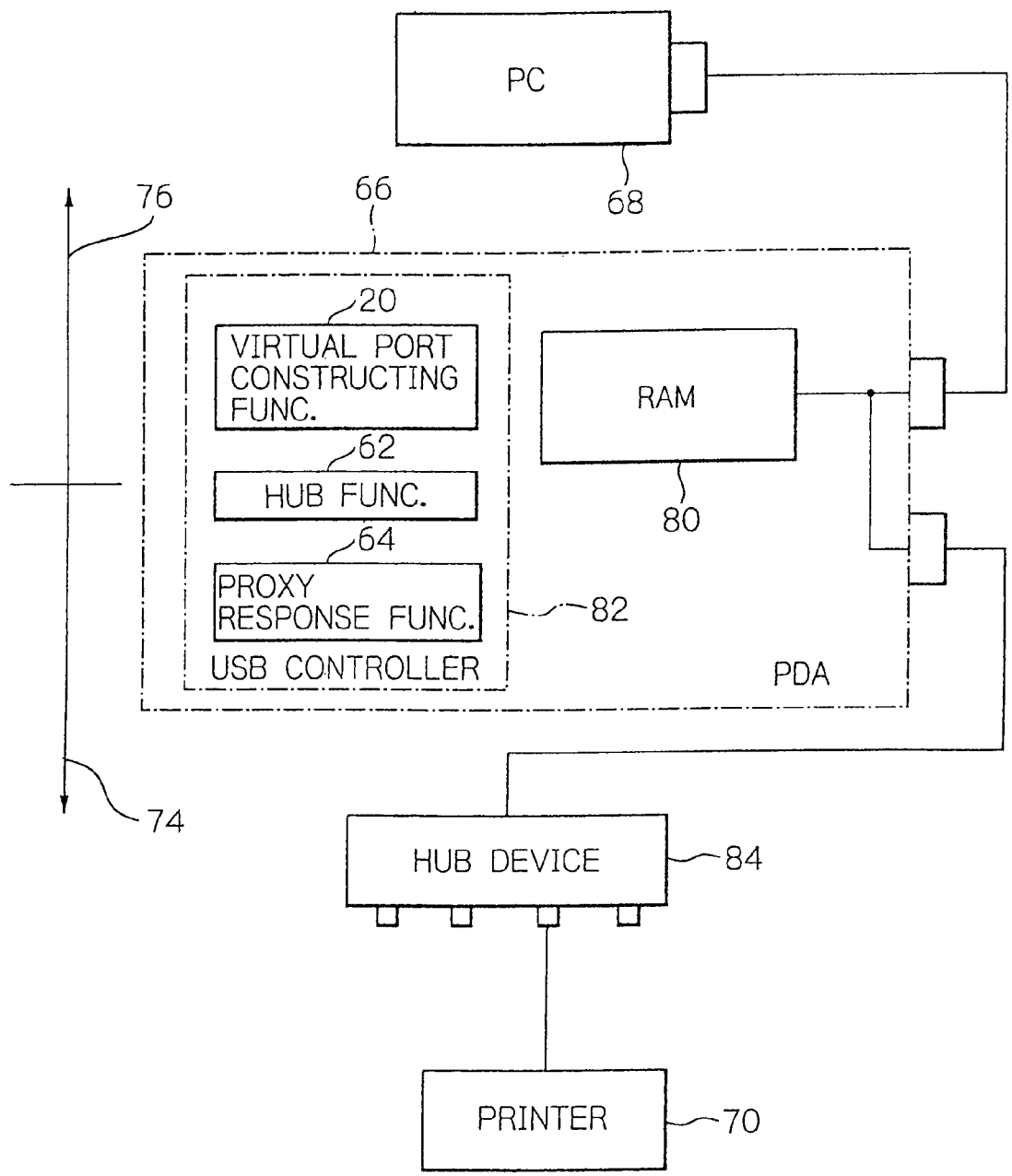
FIG. 10 depicts the schematic configuration for providing the PDA of the USB-OTG standard with a multi-task function and the connection of networks of heterogeneous standards.

Of the constituent elements, shown in FIG. 10, the PDA 66 includes a RAM (random access memory) 80 and a USB controller 82. The RAM 80 is a buffer storage for temporarily storing the supplied data. The USB controller 82 includes plural functions of controlling the communication of the USB devices on the USB network 74. Among these functions, the controller 82 serves as the virtual port constructing functional unit 20, shown in FIG. 1, in addition to the hub functional unit 62 and the proxy response functional unit 64, shown in FIG. 7.

The USB controller 82 is contained in the aforementioned PDA 66, although not shown, and represents a characteristic functional unit of the PDA. The USB network 74 includes a hub device 84 provided between the PDA 66 and the printer 70, as is different from the structure shown in FIG. 7. The USB-OTG network 76 includes the personal computer 68 and the PDA 66 functioning as USB-OTG devices. In the USB network 74, there are provided the PDA 66, a hub device 84 and the printer 70 acting as USB devices and interconnected as illustrated in FIG. 10. When the personal computer 68 transfers printing data to the printer 70 through the PDA 66, a delay due to a low-speed response from the printer 70 would cause the personal computer 68 to wait and be obstructed from multi-tasking.

Thus, the personal computer 68 entrusts the printing to the PDA 66 having the hub function. In conjunction with the entrusting of the printing, the personal computer 68 transfers printing data to the RAM 80 in the PDA 66. Before transferring the data, the PDA 66 verifies the connection conditions. In the PDA 66, the USB controller 82 is responsive to the conditions of connection of the printer 70 to the hub device 84 to actuate the virtual port constructing functional unit 20 to construct a virtual port. Based on the function of the hub functional unit 62, the PDA 66 acts as if the printer 70 is connected to this virtual port. The printing data, supplied from the upstream facing port, are temporarily stored in the RAM 80 of the PDA 66. The hub functional unit 62 includes a hub controller, not shown. The write control for the RAM 80 is managed by a hub repeater which is under the control of a hub controller. Under the control of the hub controller, the hub repeater sends out the printing data, stored in the RAM 80, to an appropriate downstream facing port with a route designation added.

This sending-out may be performed independently of the transfer processing by the personal computer 68. In such circumstances, the speed control mechanism, such as a transaction translator, included in the hub functional unit 62 adjusts the transmission rate in conformity with the printing speed of the printer 70. This means buffering with the aid of the RAM 80, and may also be grasped as realization of a multi-task bus in the USB network 76. As a result, the RAM 80 sends out stored printing data, along with the independent request, in keeping with the speed of the printer 70. Thus, with the personal computer 68, it is possible to establish a broader bandwidth of the USB-OTG network 76. For example, the transmission rate can be maintained at the maximum rate of 12 Mbit/sec provided for in the standard of the USB version 1.1.

Meanwhile, the multi-tasking by the personal computer 68 is applicable not only to the USB-OTG network 76, but also to the usual USB network 74, in which case the multi-tasking may be achieved in a similar manner.

By the above-described operation, the tasks performed by the host may be shared so that the USB bus of the USB network 74 may be handled virtually as a multi-tasking, as a result of which the USB system in its entirety may be improved in operating efficiency.

With the above configuration of the USB system 10, a number of the USB-OTG devices exceeding the limited number of tiers prescribed can be connected in cascade of the host device 12—hub device 16—USB device 18, based on the construction and connecting functions of the virtual ports of the virtual port constructing functional unit 20 of the hub device 14. Moreover, if the host device 12 addresses the USB device 18 on the downstream side, the hub device 14 operates as if the hub device 14 behaves as the specified USB device 18, thanks to the proxy response functional unit 22 of the hub device 14, and readily transmits, by way of a proxy response, the contents depending upon the situation that, for example, the USB device on the downstream side is not ready, or the contents dependent upon prevailing conditions. Thus, no problem related to the turn-around time of the USB bus is raised even if the prescribed number of tiers is surpassed. In actual, although it takes a significant period of time until a response is returned, it is possible to accomplish a free or unrestrained connection of a number of tiers exceeding the prescribed limitation on the number of tiers.

By providing the bus device or the host device as constituent elements of the USB system 10 with the similar functions, the degree of freedom and the operation of the respective devices may be improved in such a manner that the number of connections of the respective devices, the delay time or the turn-around time incurred during connection may be shortened.

With the communication control method of the USB system 10 in which the hub devices 14 and 16 and the USB device 18 are connected together in cascade, a virtual port may be constructed in the hub device 14, and setting is made for a case where the USB device 18 is connected to the virtual port, whereby the number of tiers of the hub devices or the USB devices may be increased beyond the prescribed number. In addition, by responding by the hub device 14 in deputy for the USB device 18, a response may be obtained in a shorter time than the turn-around time for the host device 12. In actual, although it takes an appreciable time until the USB device 18 returns a regular response, it is possible to achieve a number of connectable tiers in excess of the prescribed number and free device connection.

In a communication control method over a network system in which the USB network 74 and the USB-OTG network 76 co-exist, a virtual port is constructed in the PDA 66 depending on the verified connection state, and the construction of the virtual port causes an operation to be performed similarly to when the printer 70 of the USB standard is connected to the system to provide for connection to a number of tiers in excess of the prescribed number of tiers. Data transfer to the printer 70 of the USB standard is detected by the PDA 66. Depending on this detection, the data are transferred to the printer 70 of the USB standard, thus providing for communication with the device of another heterogeneous network. The PDA 66 makes a response in deputy for the printer 70 of the USB standard to transfer data from the PDA 66 to the printer 70 of the USB standard to effect proxy response of the communication. Thus, as the functions of the connection devices are dynamically or adaptively selectively exploited, the provisions of the USB and USB-OTG standards are satisfied to control the communication between the heterogeneous networks.

In the above-described communication control method of the network system, not only the communication from the host to the USB-OTG device connected to the downstream side of the OTG device 60 is arbitrated, but also the OTG device 60 issues an independent request in the USB network 74 which includes the RAM 80 and the OTG device and is separate from the USB-OTG network including the host device, thereby sharing the task of the host device. In other words, the USB bus forming the USB network 74 is handled as a pseudo-multi-task bus to improve the operating system of the overall USB system.

The entire disclosure of Japanese Patent Application No. 2003-84979 filed on Mar. 26, 2003, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of controlling communication over a bus communication system in which a plurality of line concentrators, each having line concentrating and switching functions, are connected to a host device, comprising:

a first step of constructing a virtual port in one line concentrator when another line concentrator is connected to a physical port provided to said one line concentrator and a bus device is connected to said another line concentrator;

a second step of setting an operation as if said bus device is connected to the virtual port;

a third step of causing, in setting a bus connection by said host device, said one line concentrator to respond to communication associated with the setting of the bus connection from said host device to said bus device, to take a place of said bus device; and a fourth step of setting the bus connection by communication with said one line concentrator responsive to the response.

2. The method in accordance with claim 1, further comprising:

a fifth step of transferring, subsequently to said fourth step, data from said host device to said one line concentrator;

a sixth step of detecting the transferred data by said one line concentrator and responding to said host device, upon detection of the transferred data, to take the place of said bus device; and a seventh step of transferring the transferred data to said bus device by said one line concentrator.

3. The method in accordance with claim 2, wherein, in said fourth step, said one line concentrator acts in deputy for said bus device in making the response, while performing a first processing of transferring data from said host device in the setting of the bus connection by control transfer and determining a form of transfer in terms of scheduling of said host device as a unit, a second processing of read-out transferring of the data based on said unit, and a third processing of write-in transferring of the data based on said unit.

4. The method in accordance with claim 3, wherein, in said sixth step, in response to detection of the transferred data by a connection device, the detected data are temporarily stored; and in said seventh step, the stored data are transferred to said bus device of another network.

5. The method in accordance with claim 4, wherein a number of tiers of connection to said host device is equal to or more than seven based on construction of the virtual port in said one line concentrator.

6. The method in accordance with claim 2, wherein, in said sixth step, in response to detection of the transferred data by a connection device, the detected data are temporarily stored; and in said seventh step, the stored data are transferred to said bus device of a another network.

7. The method in accordance with claim 6, wherein a number of tiers of connection to said host device is equal to or more than seven based on construction of the virtual port in said one line concentrator.

8. The method in accordance with claim 2, wherein in said fourth step, said one line concentrator acts in deputy for said bus device in making the response, while performing a first processing of transferring data from said host device in the selling of the bus connection by control transfer and determining a form of transfer in terms of scheduling of said host device as a unit, a second processing of read-out transferring of the data based on said unit, and a third processing of write-in transferring of the data based on said unit.

9. The method in accordance with claim 1, wherein the plurality of line concentrators are operated under a Universal Serial Bus (USB) standard.

10. A method controlling communication over a network system including a first network formed by a device satisfying a Universal Serial Bus-On-The-Go (USB-OTG) standard, said device of the USB-OTG standard forming said first network being a connection device, and a second network formed by connecting a line concentrator, having a transferring and line-concentrating function and operating on a USB standard, to a port of said connection device and by connecting a device of the USB standard to a port of said line concentrator, said second network being connected to said first network, said method comprising:
   a first step of determining a state of connection and constructing a virtual port distinct from a physical port actually provided to said connection device, subject to a condition that said connection device is located simply as a device;
   a second step of setting said device of the USB standard connected to the port of said line concentrator by a function of said connection device in selling an operation as if said device of the USB standard is connected to the virtual port;
   a third step of detecting data to be transferred to said device of the USB standard by said connection device, transferring the data to said device of the USB standard responsive to the detection, and responding in proxy for said device of the USB standard; and
   a fourth step of transferring additional data from said connection device to said device of the USB standard subsequent to the response.

11. The method in accordance with claim 10, wherein said data transferred in said fourth step is associated with bus connection setting.

12. The method in accordance with claim 11, wherein if said connection device is a slave, said third and fourth steps are executed, and if said connection device is a master, said third step is executed and said fourth step is omitted.

13. The method in accordance with claim 11, further comprising:
   a fifth step of transferring, subsequent to said fourth step, data from a device corresponding to a master of the first network to said device of the USB standard of the second network;
   a sixth step of detecting the transferred data by said connection device and making a response to the device corresponding to the master, responsive to the detection, in deputy for said device of the USB standard of the second network; and
   a seventh step of transferring the transferred data from said connection device to said device of the USB standard of the second network subsequent to the response in deputy.

14. The method in accordance with claim 13, wherein in said sixth step, in response to detection of the transferred data by said connection device, the detected data are temporarily stored; and
   in said seventh step, the stored data are transferred to said line concentrator of the second network.

15. The method in accordance with claim 14, wherein when said connection device is a slave, a number of tiers of connection by said line concentrator to a host device in the first network is equal to or more than six.

16. The method in accordance with claim 14, wherein when said connection device is a slave, a number of tiers of connection by said line concentrator to a host device is set to five or more, based on construction and connection of the virtual port and a proxy response function; and
   when said connection device is a master, the number of tiers of connection by said line concentrator to said host device is set to five or more, based on the construction and connection of the virtual port.

17. The method in accordance with claim 10, wherein if said connection device is a slave, said third and fourth steps are executed, and if said connection device is a master, said third step is executed and said fourth step is omitted.

18. The method in accordance with claim 17, further comprising:
   a fifth step of transferring, subsequent to said fourth step, data from a device corresponding to a master of the first network to said device of the USB standard of the second network;
   a sixth step of detecting the transferred data by said connection device and making a response to the device corresponding to the master, responsive to the detection, in deputy for said device of the USB standard of the second network; and
   a seventh step of transferring the transferred data from said connection device to said device of the USB standard of the second network subsequent to the response in deputy.

19. The method in accordance with claim 18, wherein in said sixth step, in response to detection of the transferred data by said connection device, the detected data are temporarily stored; and
   in said seventh step, the stored data are transferred to said line concentrator of the second network.

20. The method in accordance with claim 19, wherein when said connection device is a slave, a number of tiers of connection by said line concentrator to a host device in the first network is equal to or more than six.

21. The method in accordance with claim 19, wherein when said connection device is a slave, a number of tiers of connection by said line concentrator to a host device is set to five or more, based on construction and connection of the virtual port and a proxy response function; and
   when said connection device is a master, the number of tiers of connection by said line concentrator to said host device is set to five or more, based on the construction and connection of the virtual port.

22. The method in accordance with claim 10, further comprising:
   a fifth step of transferring, subsequent to said fourth step, data from a device corresponding to a master of the first network to said device of the USB standard of the second network;

a sixth step of detecting the transferred data by said connection device and making a response to the device corresponding to the master, responsive to the detection, in deputy for said device of the USB standard of the second network; and a seventh step of transferring the transferred data from said connection device to said device of the USB standard of the second network subsequent to the response in deputy.

23. The method in accordance with claim 22, wherein in said sixth step, in response to detection of the transferred data by said connection device, the detected data are temporarily stored; and in said seventh step, the stored data are transferred to said line concentrator of the second network.

24. The method in accordance with claim 23, wherein when said connection device is a slave, a number of tiers of connection by said line concentrator to a host device in the first network is equal to or more than six.

25. The method in accordance with claim 23, wherein when said connection device is a slave, a number of tiers of connection by said line concentrator to a host device is set to five or more, based on construction and connection of the virtual port and a proxy response function; and when said connection device is a master, the number of tiers of connection by said line concentrator to said host device is set to five or more, based on the construction and connection of the virtual port.

* * * * *